United States Patent
Schäfer et al.

(10) Patent No.: US 12,110,691 B2
(45) Date of Patent: Oct. 8, 2024

(54) METHOD OF ATTACHING A LINING TO THE INTERIOR SURFACE OF A ROOM

(71) Applicants: Knauf Gips KG, Iphofen (DE); 3D Coatings GmbH & Co. KG, Reichenberg (DE)

(72) Inventors: Matthias Schäfer, Bütthard (DE); Claus-Peter Berneth, Marktbreit (DE); Gottfried Philipp, Kist (DE); Andreas Marquardt, Güntersleben (DE)

(73) Assignee: Knauf Gips KG and 3D Coatings GmbH & Co. KG (DE)

( * ) Notice: Subject to any disclaimer, the term of this patent is extended or adjusted under 35 U.S.C. 154(b) by 930 days.

(21) Appl. No.: 17/057,557

(22) PCT Filed: Jun. 6, 2018

(86) PCT No.: PCT/EP2018/000292
§ 371 (c)(1),
(2) Date: Nov. 20, 2020

(87) PCT Pub. No.: WO2019/228603
PCT Pub. Date: Dec. 5, 2019

(65) Prior Publication Data
US 2021/0198897 A1    Jul. 1, 2021

(30) Foreign Application Priority Data
May 30, 2018  (WO) ................. PCT/EP2018/000281

(51) Int. Cl.
*B32B 43/00*      (2006.01)
*E04F 13/00*      (2006.01)
(Continued)

(52) U.S. Cl.
CPC ............ *E04F 13/002* (2013.01); *B29C 65/48* (2013.01); *B29C 65/526* (2013.01); *B29C 65/74* (2013.01);
(Continued)

(58) Field of Classification Search
CPC ............. B32B 43/006; Y10T 156/1195; Y10T 156/1994; B29C 65/48; B29C 65/526; B29C 65/74
See application file for complete search history.

(56) References Cited

U.S. PATENT DOCUMENTS

| 5,449,540 A * | 9/1995 | Calhoun .................... C09J 7/20 |
| | | 428/354 |
| 2003/0129343 A1* | 7/2003 | Galkiewicz ................ C09J 7/38 |
| | | 428/40.1 |

(Continued)

FOREIGN PATENT DOCUMENTS

| CA | 2135016 A1 | 1/1996 |
| CN | 206267449 U | 6/2017 |

(Continued)

*Primary Examiner* — Philip C Tucker
*Assistant Examiner* — Nickolas R Harm
(74) *Attorney, Agent, or Firm* — Mark Terry

(57) ABSTRACT

Method of attaching a lining 1 to an interior surface 10 of a room comprising the steps of:
   providing a first sheet of lining 1 to be applied to the interior surface 10;
   applying a plurality of glue dots 2 to the interior surface 10 or to the first sheet of lining 1; and
   attaching the first sheet of the lining 1 to the interior surface 10 such that the first sheet of lining 1 is fixed to the interior surface 10 via the glue dots.

12 Claims, 4 Drawing Sheets

Figure 1G:
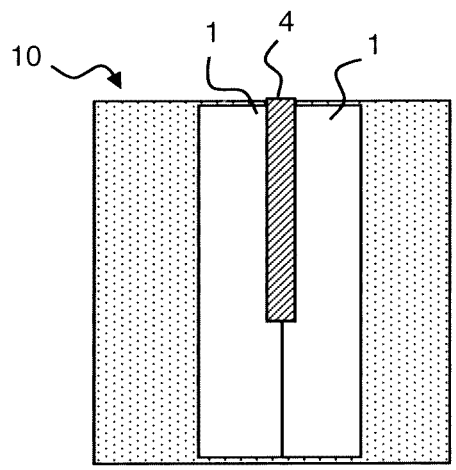

(51) Int. Cl.
 *B29C 65/48* (2006.01)
 *B29C 65/52* (2006.01)
 *B29C 65/74* (2006.01)

(52) U.S. Cl.
 CPC ........ *B32B 43/006* (2013.01); *Y10T 156/1195* (2015.01); *Y10T 156/1994* (2015.01)

(56) References Cited

U.S. PATENT DOCUMENTS

| | | | | |
|---|---|---|---|---|
| 2006/0216451 | A1* | 9/2006 | Weiner | G09F 3/10 428/40.1 |
| 2007/0190281 | A1* | 8/2007 | Hooft | E04C 2/543 156/289 |
| 2010/0260979 | A1* | 10/2010 | Kai | C09J 7/38 428/195.1 |
| 2011/0214798 | A1* | 9/2011 | Tracy | C09J 7/38 428/41.8 |
| 2013/0047538 | A1* | 2/2013 | Taylor | E04F 15/02155 52/309.3 |
| 2016/0319538 | A1* | 11/2016 | Pham | B32B 37/14 |
| 2017/0266919 | A1* | 9/2017 | Seok | B32B 7/14 |
| 2018/0370186 | A1* | 12/2018 | Everaerts | B32B 3/18 |
| 2021/0403763 | A1* | 12/2021 | Schafer | E04F 13/0896 |

FOREIGN PATENT DOCUMENTS

| | | |
|---|---|---|
| DE | 3328165 A1 | 2/1985 |
| WO | 2015172799 A1 | 11/2015 |
| WO | 2018072278 A1 | 4/2018 |

* cited by examiner

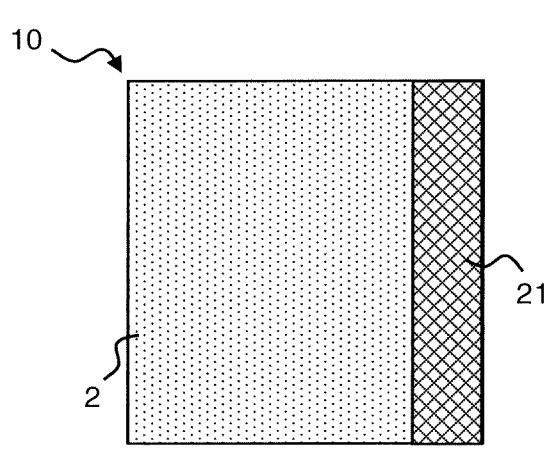
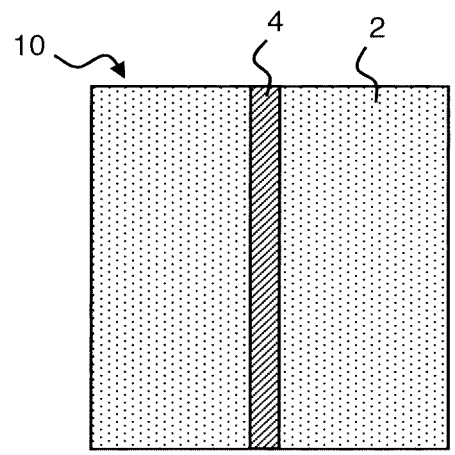
Fig. 1a　　　　　　　　　　　　　Fig. 1b
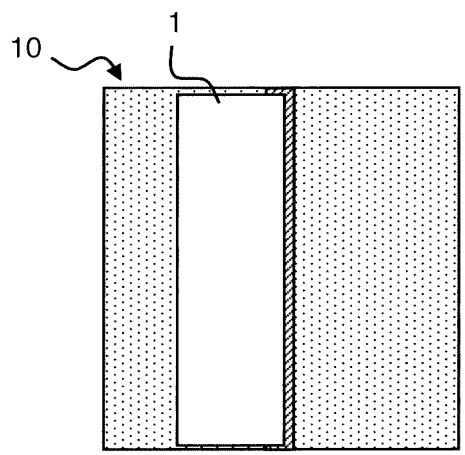
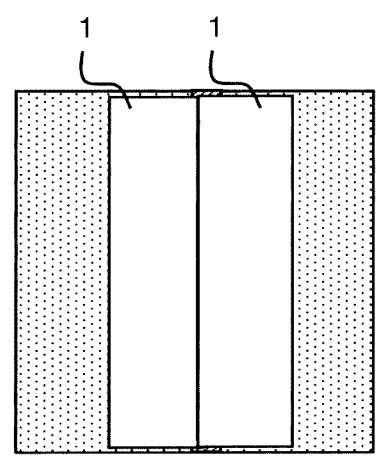
Fig. 1c　　　　　　　　　　　　　Fig. 1d
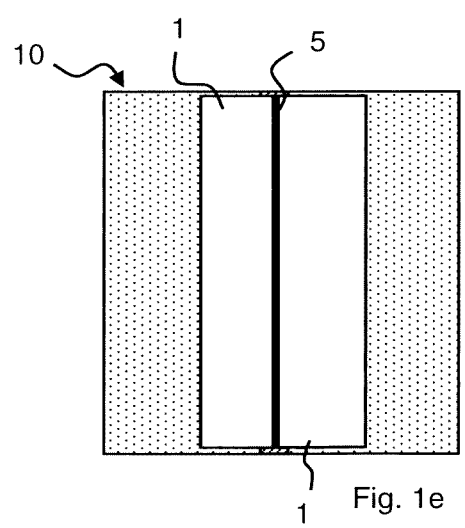
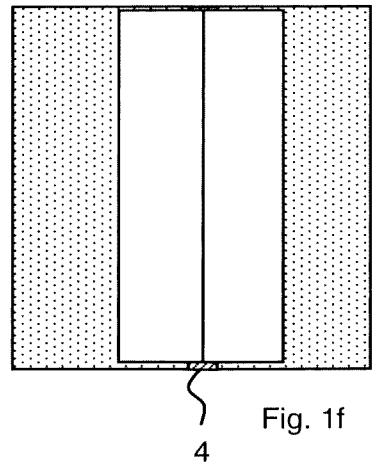
Fig. 1e　　　　　　　　　　　　　Fig. 1f

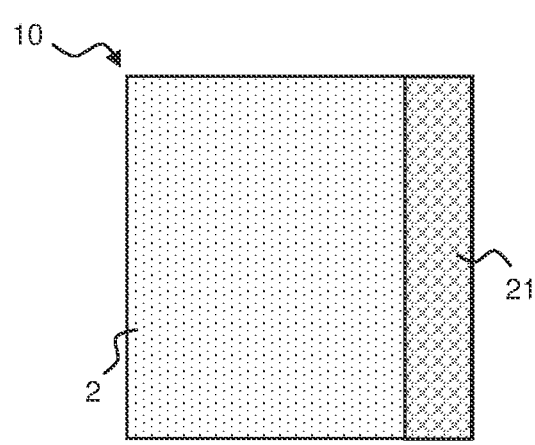
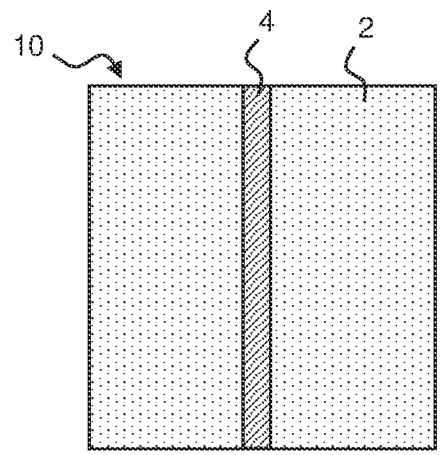
Fig. 1a
Fig. 1b
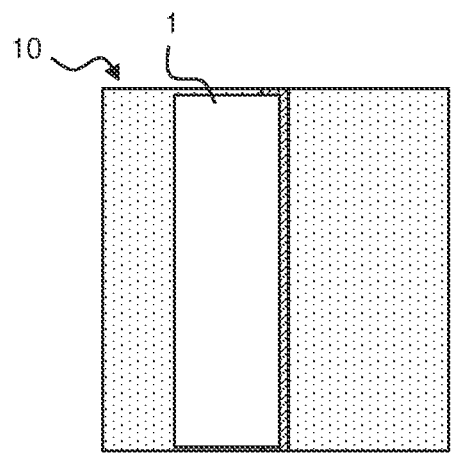
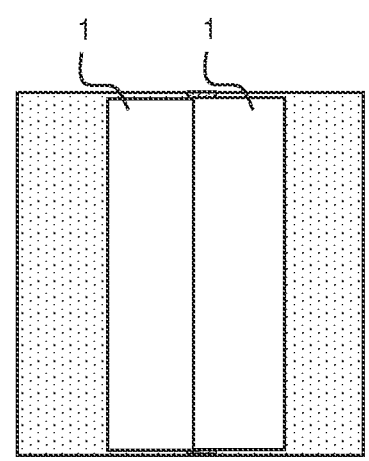
Fig. 1c
Fig. 1d
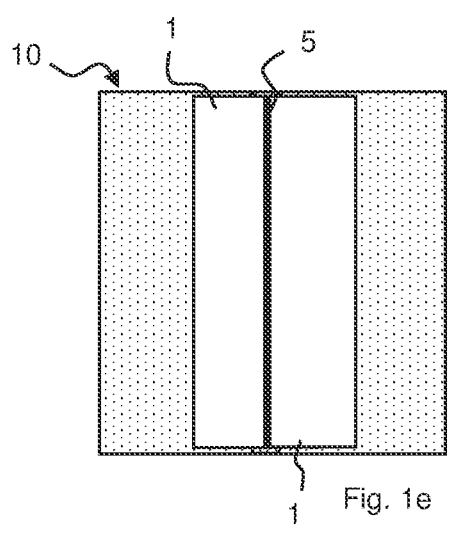
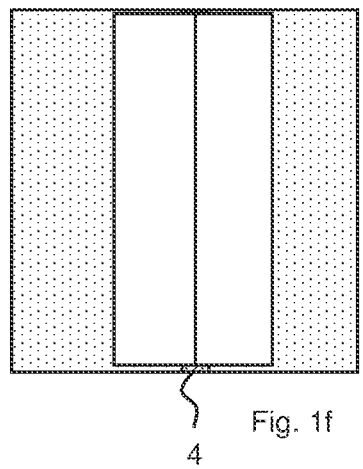
Fig. 1e
Fig. 1f

METHOD OF ATTACHING A LINING TO THE INTERIOR SURFACE OF A ROOM

The invention relates to a method of attaching a lining to an interior surface of a room according to the independent claim.

The invention relates to the technical field of methods for interior constructions and in particular to methods for the attachment of a lining for covering a wall or a ceiling of the room.

Such a method can be used for example in case of the attachment of a lining to an acoustic ceiling. It is known to apply perforated building panels (i. e. perforated gypsum plasterboards) specifically in the construction of acoustic ceilings or walls. Such an acoustic plasterboard has a plurality of perforations shaped therein extending nearly over the entire surface. The perforations are visually dominant which is disadvantageous for many uses.

It is known from WO 2015 172 799 A1 to provide a sound-permeable lining for covering perforations shaped in an acoustic plasterboard. For providing an optically closed surface, the sound-permeable lining is attached so as to cover perforations shaped in the applied acoustic plasterboard. The sound-permeable lining comprises a first ply of a fleece material and a second ply which is arranged in between of the first ply and the acoustic plasterboard to which the sound-permeable lining is attached.

In principle, the sound-permeable lining is attached to the mounted acoustic plasterboards in the same manner as wallpaper. The wallpaper is attached in strips to the wall or ceiling by cutting the wallpaper to a predetermined length before attachment.

Contrary to conventional methods for attachment of wallpapers such a sound permeable lining cannot be attached by use of liquid glue because liquid glue would close the surface of the sound permeable lining and prevents the penetration of air. Another problem with sound permeable lining attached in this manner is, that the wet glue causes shadow areas after drying out. Shadow areas have a slightly different color than the neighboring areas so they are easily perceivable with the human eye.

The object of the invention is therefore to provide a method for attaching a lining an interior surface in a room covering at least in part said interior surface which overcomes or at least reduces the disadvantages known from the prior art. In particular it is a method for the attachment of a lining to a wall or ceiling without the need of a liquid glue.

The problem is solved by a method for attaching of a lining for covering an interior surface of a room, i.e. wall or ceiling according to the independent claim. Preferred technical aspects form the subject matter of the respective dependent claims.

The invention comprises a method of attaching a lining to an interior surface of a room.

The method includes the steps of:
providing a first sheet of lining to be applied/attached to the interior surface; (and thereafter)
applying a plurality of glue dots to the interior surface or to the first sheet of lining; and (thereafter)
attaching the first sheet of lining to the interior surface in such a manner that the first sheet of lining is fixed to the interior surface via the glue dots.

The application of the plurality of glue dots to the interior surface or to the sheet of lining overcomes the disadvantages related to the use of liquid glue. Preferably, the glue dots are pressure sensitive adhesives (i.e. hot melt pressure sensitive adhesive) and/or temperature activable adhesives. The glue dots preferably have a size range from 0.1 to 3.0 mm. They can be arranged in a regular pattern, for example of 3 to 100 dpi (=dots per inch). The glue dots preferably have an adhesive base weight of 10 to 150 $g/m^2$. By attaching the first sheet of lining to the interior surface in such a manner that the first sheet of lining is fixed to the interior surface via the glue dots, no shadow areas occur. The alternative of applying a plurality of glue dots to the interior surface is particularly advantageous in case of perforated building panels because the glue dots are only applied at contact areas between the lining and the perforated building panel and do not cover the entire lining surface.

According to a preferred technical aspect, the method further comprises the step of pressing the first sheet of lining to the interior surface. In particular in case of pressure sensitive adhesive glue dots, the strength of the adhesion between the surface and the lining can be increased by the application of pressure.

It is particularly preferred that the step of pressing the first sheet of lining to the interior surface is carried out with a roller, a trowel or a brush. A trowel is a tool which is normally already present during the attachment of the lining and allows for applying a high pressure.

A brush allows for applying pressure in a very uniform manner. A roller allows for applying pressure with a soft outer surface.

Another advantageous aspect relates to the step of applying a plurality of glue dots comprising applying a transfer sheet with the plurality of glue dots onto the interior surface or onto the first sheet of lining and removing a release sheet which is part of the transfer sheet to leave the plurality of glue dots on the interior surface or on the first sheet of lining. The transfer sheet allows storing the glue dots on the release sheet as "ready to apply", so the glue dots can be applied immediately before the attachment of the lining. Preferably, the release sheet is made of silicone paper or silicone foil. However, the release sheet can be made of any material suitable to release the glue dots when applied to an interior surface or a sheet of lining.

Preferably, the step of removing the release sheet from the transfer sheet is carried out in presence of heat. After the application of the transfer sheet to the interior surface or the sheet of lining, the release sheet is peeled off from the surface to which the transfer sheet is applied, while the glue dots stay attached to the surface. The heat can be applied by use of a dryer, i.e. a hairdryer or an infrared heater.

It is particularly preferred that the method further comprises the step of covering the glue dots, which are arranged such that they get in contact with an edge section of the first sheet of the attached lining, with a cover tape. The cover tape prevents the glue dots from sticking to the interior surface and the lining at the same time, thus allowing for the lining to be cut to the appropriate size while already partly attached to the surface. The remaining cover tape is removed after the cut, and the edges of the second and the first sheet of lining are finally glued to the interior surface.

According to another particularly preferred aspect, the method comprises the step of attaching a second sheet of lining to the interior surface adjacent to the first sheet of lining in the same manner.

Advantageously, the second sheet of lining is attached to the interior surface adjacent to the first sheet of the lining in such that the sheets partly overlap. The overlap is preferably in such a manner that the respective edge portions of the first and the second sheet of lining are arranged in a parallel manner. The minimum overlap distance of the respective edge portions is 0.5 cm.

It is preferred that the method further comprises the step of cutting the second sheet of lining overlapping with the first sheet of lining simultaneously in one single cut. For example a cutter device can be used. The overlapping portions are pressed together and a cut through both sheets at the same time and while they overlap is carried out, i.e. simultaneously in one single cut.

In a technically preferred aspect, the step of cutting the second sheet of lining and the first sheet of lining while overlapping comprises the application of a marker tape. The marker tape allows marking the line along which the cut is carried out. The marker tape can for example have a width in the range of 0.5 cm to 5 cm.

After the "double" cut of first and second sheet of lining particularly preferably the step of removing the cover tape and pressing the bordering sections of the second sheet and the first sheet of lining onto the interior surface is carried out. Due to the complementarily cut edges a nearly invisible border section is achieved.

According to another advantageous aspect a further sheet of lining can be correspondingly attached adjacent to an already attached sheet of lining.

It is further preferred that the interior surface is an acoustic ceiling made of perforated building panels. In case of an acoustic ceiling, the step of cutting the second sheet of lining overlapping with the first sheet of lining simultaneously in one single cut is preferably carried out along the bridge portions of the ceiling panels that border adjacent perforations.

In the following the invention will be explained in more detail with reference to the drawings. Like reference numerals denote similar features throughout the drawings.

The drawings show:

FIG. 1a-1h a view from below to a section of a ceiling to which a lining is attached according to the method of the invention; and FIG. 2 a ceiling of a room with a plurality of attached sheets of lining.

In FIG. 1a to 1h the method of attaching a lining to an interior surface 10 of a room is exemplified by attaching a lining to a section of a ceiling surface 10 of a room.

In FIG. 1a a plurality of glue dots 2 is applied to to the interior surface 10. The step of applying a plurality of glue dots 2 comprises applying a transfer sheet 21 comprising the plurality of glue dots 2 onto the interior surface 10 and removing a release sheet of the transfer sheet 21 leaving the plurality of glue dots on the interior surface 10. Alternatively it is also possible to apply the glue dots 2 to the first sheet of lining 1. The transfer sheet 21 comprises a release sheet 21 made of a silicon paper to which the glue dots 2 adhere. The transfer sheet 21 can be applied in strips in a parallel manner, wherein the removal of the transfer sheet 21 is carried out in the presence of heat, e. g. by use of a hairdryer. Alternatively, the transfer sheet can have any other convenient size.

FIG. 1b illustrates the step of covering the glue dots 2 which are arranged such that they get in contact with an edge section of the applied first sheet of lining 1 with a cover tape 4.

FIG. 1c illustrates the step of attaching the first sheet of the lining 1 to the interior surface 10 in such a manner that the first sheet of lining 1 is fixed at least partly to the interior surface 10 via the glue dots 2. The edge section of the first sheet of lining 1 overlapping the cover tape 4 is not yet fixed to the interior surface 10.

FIG. 1d illustrates the step of attaching a second sheet of lining 1 to the interior surface 10 adjacent to the first sheet of lining 1. The second sheet of lining 1 is at least partly attached to the interior surface 10 adjacent to the first sheet of the lining 1. The edges of the first and the second sheet of lining partly overlap.

FIG. 1e illustrates the application of a marker tape 5 on top of the edge portion of the lining 1. The marker tape 5 indicates the cutting line along which the cut is directed. The actual cut can for example be carried out along one of its edges. If the interior ceiling is made of acoustic panels with perforations, preferably the cut is made along the bridge portions that border adjacent perforations of the perforated acoustic panel. The cut can be carried out in the middle of the cover tape 4 or along one of its edges.

Figure if illustrates the step of cutting the second sheet of lining 1 overlapping the first sheet of lining 1 simultaneously in one single cut. FIG. 1g illustrates the removal of the cover tape 4 after the cut, wherein in the present illustration the cover tape 4 is half pulled out from between of the edges of the linings. After the cover tape 4 has been removed, the edges of the linings can be attached to the formerly covered glue dots.

Figure 1H:
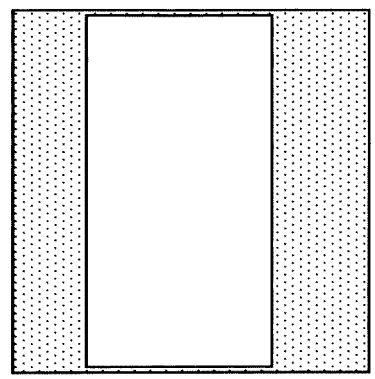

FIG. 1h illustrates a ceiling 10 of a room with attached adjacent strips of linings after cutting and the removal of cover tape.

Figure 2:
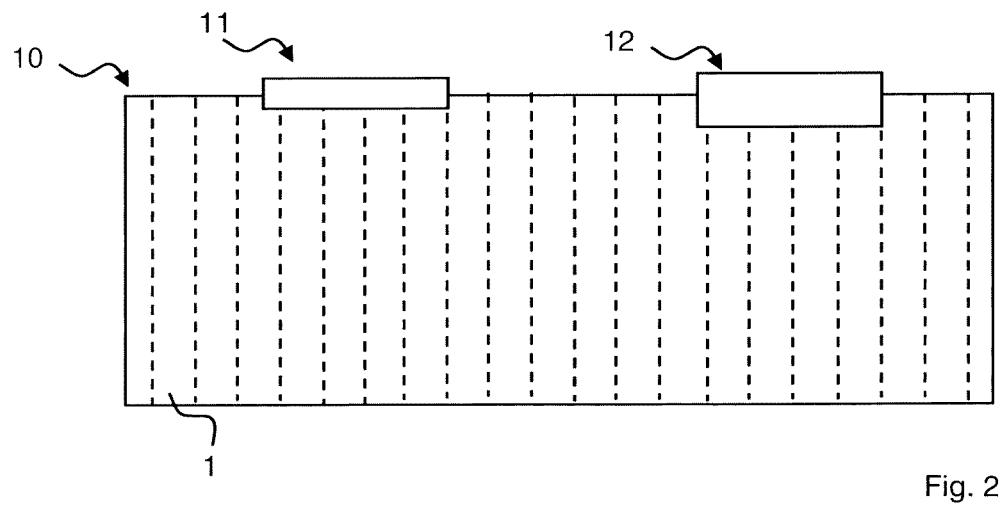
Figure 1G:
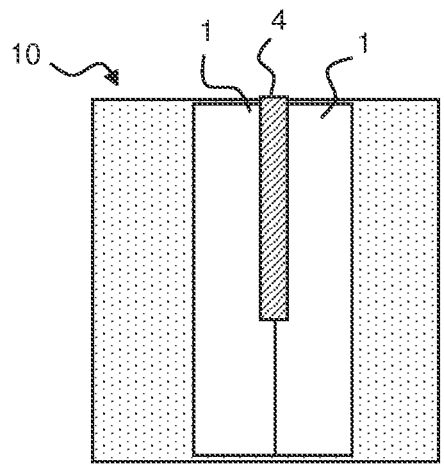
Figure 1H:
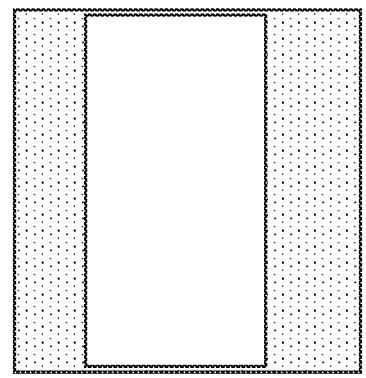
Figure 2:
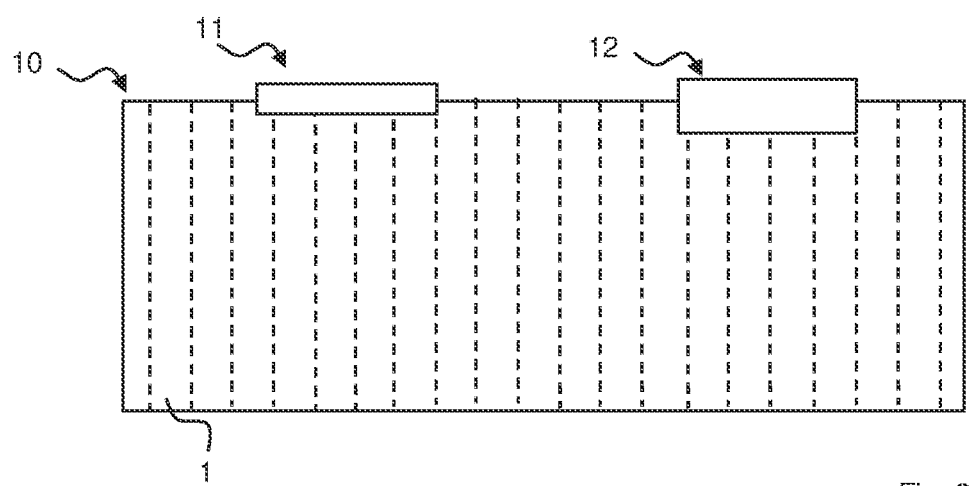

In FIG. 2 a ceiling 10 of a room is shown having attached thereto a plurality of the linings 1. The room has a window 11 and a door 12 to exemplify the arrangement of the linings in such a room.

The invention claimed is:

1. Method of attaching a lining to an interior surface of a room comprising the steps of:
    providing a first sheet of lining to be applied to the interior surface;
    applying a plurality of glue dots to the interior surface or to the first sheet of lining,
    attaching the first sheet of the lining to the interior surface such that the first sheet of lining is fixed to the interior surface via the glue dots; and
    covering the glue dots that are applied to the interior surface such that they get in contact with an edge section of the attached first sheet of lining with a cover tape.

2. Method according to claim 1, further comprising the step of pressing the first sheet of lining to the interior surface.

3. Method according to claim 2, wherein the step of pressing the first sheet of lining to the interior surface is carried out with a roller, a trowel or a brush.

4. Method according to claim 1, wherein the step of applying a plurality of glue dots comprises applying a transfer sheet with the plurality of glue dots onto the interior surface or the first sheet of lining and removing a release sheet of the transfer sheet leaving the plurality of glue dots on the interior surface or the first sheet of lining.

5. Method according to claim 4, wherein the step of removing the release sheet of the transfer sheet is carried out in the presence of heat.

6. Method according to claim 5, further comprising the step of attaching a second sheet of lining to the interior surface adjacent to the first sheet of lining in the same manner as the first sheet of lining.

7. Method according to claim 6, wherein the second sheet of lining is attached to the interior surface adjacent to the first sheet of the lining such that the sheets partly overlap.

8. Method according to claim 7, further comprising the step of cutting the second sheet of lining overlapping with the first sheet of lining so as to cut through both the first and second sheets of lining simultaneously in one single cut.

9. Method according to claim 8, wherein the step of cutting the second sheet of lining and the first sheet of lining while overlapping comprises the application of a marker tape.

10. Method according to claim 8, further comprising the step of removing the cover tape and pressing bordering sections of the second sheet of lining, where the cut was carried out, and the first sheet of lining onto the interior surface.

11. Method according to claim 8, further comprising the step of removing the cover tape and pressing bordering sections of the second sheet, where the cut was carried out, and the first sheet of lining onto the interior surface.

12. Method according to claim 1, wherein the interior surface is an acoustic ceiling made of perforated building panels.

\* \* \* \* \*